(12) United States Patent
Fouquet et al.

(10) Patent No.: US 9,114,369 B2
(45) Date of Patent: Aug. 25, 2015

(54) JAR FOR PROCESSING FOODSTUFFS FOR A BLENDER

(71) Applicant: SANTOS, Vaulx-en-Velin (FR)

(72) Inventors: Nicolas Fouquet, Chassieu (FR); Benoit Verbeke, Echalas (FR)

(73) Assignee: SANTOS, Vaulx-en-Velin (FR)

( * ) Notice: Subject to any disclaimer, the term of this patent is extended or adjusted under 35 U.S.C. 154(b) by 313 days.

(21) Appl. No.: 13/746,371

(22) Filed: Jan. 22, 2013

(65) Prior Publication Data

US 2013/0215707 A1 Aug. 22, 2013

Related U.S. Application Data

(60) Provisional application No. 61/601,644, filed on Feb. 22, 2012.

(30) Foreign Application Priority Data

Feb. 21, 2012 (FR) ...................................... 12 51577

(51) Int. Cl.
| | |
|---|---|
| *B01F 7/16* | (2006.01) |
| *A47J 43/046* | (2006.01) |
| *A47J 43/07* | (2006.01) |

(52) U.S. Cl.
CPC ............... *B01F 7/162* (2013.01); *A47J 43/046* (2013.01); *A47J 43/0727* (2013.01)

(58) Field of Classification Search
CPC ...... B01F 7/162; A47J 43/046; A47J 43/0727
USPC .................... 366/130, 206, 205; D7/413, 536
See application file for complete search history.

(56) References Cited

U.S. PATENT DOCUMENTS

| | | | |
|---|---|---|---|
| 6,979,117 B2 | 12/2005 | Dickson, Jr. | |
| 2009/0283526 A1* | 11/2009 | Pierce et al. | ............... 220/254.7 |
| 2013/0217010 A1* | 8/2013 | Suchocki et al. | ............ 435/6.11 |

* cited by examiner

*Primary Examiner* — Tony G Soohoo
(74) *Attorney, Agent, or Firm* — Young & Thompson (57) ABSTRACT

This jar includes a bottom wall, bearing rotary mechanical elements for processing foodstuffs. This jar also includes a side wall extending transversely from the bottom wall while delimiting with the latter a free space in which the rotary elements act on the foodstuffs to be processed, this side wall having, opposite the bottom wall, a free end for introducing the foodstuffs into the free space. In order to make the use of this jar simple and efficient, the free end of the side wall has a regular pentagonal profile.

18 Claims, 4 Drawing Sheets

JAR FOR PROCESSING FOODSTUFFS FOR A BLENDER

BACKGROUND OF THE INVENTION

1. Field of the Invention

The present invention relates to a jar for processing foodstuffs for a blender, i.e. for an appliance which is used for mixing, liquefying and/or reducing foodstuffs into a puree. This kind of appliance is also commonly called a mixer.

A blender jar conventionally appears as a globally tubular container, the longitudinal end of which which is turned downwards when the jar is being used, is closed by a bottom wall which bears a knife which may rotate on itself and through which this knife may be driven into rotation by a transmission mechanism capable of being actuated by a motor-driven driving base on which the jar is mounted. At its end opposite to its bottom wall, the container forming the blender jar is open for introducing the foodstuffs to be processed inside this container.

2. Description of the Related Art

The prior art proposes making the containers forming the blender jars according to several geometries which induce different effects on the generation and stabilization and/or destabilization of the vortex formed by the mixed foodstuffs in the jar under the action of the knife driven into rotation. Thus, well-known and very widespread elementary geometries consist in that these containers are globally cylindrical with a circular base or a square base, optionally with slight flaring towards the free end of the container. More recently, U.S. Pat. No. 6,979,117 has proposed a more elaborate geometry: the geometrical base of the container is square but with one of the four angles of this square base, which is truncated.

BRIEF SUMMARY OF THE INVENTION

The object of the present invention is to propose a novel blender jar, the use of which is simple and efficient.

For this purpose, the object of the invention is a foodstuff processing jar for a blender, comprising:
- a bottom wall, which bears rotary mechanical means for processing the foodstuffs, and
- a side wall, which extends transversely from the bottom wall while delimiting with the latter a free space in which the rotary means act on the foodstuffs to be processed, and which has, opposite to the bottom wall, a free end for introducing the foodstuffs into the free space, said free end of the side wall having a regular pentagonal profile.

One of the underlying ideas of the invention is to base the globally tubular geometry of the jar on a pentagonal contour, i.e. a polygonal contour with five sides. In particular, the invention provides that the profile of the free end of the tubular wall of the jar should be conformed as a regular pentagon. This gives a pleasant singular aesthetical aspect to the jar according to the invention. Further, this lets the closing of the jar, easy to carry out by the user, in the sense that a lid mating this free end may be indiscriminately placed in five possible positions on the jar for purposes of obturating the latter, while allowing the peripheral contour of the jar to be "broken" into five portions, at least in its terminal portion which, during operation, is turned upwards, or even over the whole of the height of the jar: this profile segmented into five portions makes the vortex, formed by the mixed foodstuffs inside the jar, particularly efficient for homogenizing and accelerating the processing of these foodstuffs.

According to advantageous additional features of the jar according to the invention, taken individually or according to all the technically possible combinations:
- the jar further comprises a lid for closing the free end of the side wall, this lid being able to indiscriminately occupy five positions in which the lid obturates the free end;
- the side wall defines a central axis, which extends transversely to the bottom wall and which passes through the center of the regular pentagonal profile of the free end of the side wall, and the side wall consists of five portions following each other in succession around the central axis,
which five portions form, at the free end of the side wall, respectively the five identical elements forming the regular pentagonal profile of this free end, and
which five portions have, outside the free end of the side wall, an irregular pentagonal profile;
- the five portions of the side wall connect with each other two by two, around the central axis, by forming an angular connecting area, the five angular connecting areas having respective angulations for which the values are strictly greater than 90° over the whole axial extent of the side wall between its free end and the bottom wall;
- the rotary means are adapted so as to rotate on themselves around an axis of rotation, which is substantially parallel to the central axis and which is not located at an equal distance from the five portions of the side wall;
- a first of the five portions of the side wall has a plane of symmetry which passes through the central axis, second and third of the five portions being respectively the symmetrical of the fourth and fifth portions with respect to this plane of symmetry;
- the plane of symmetry further passes through the axis of rotation and among the five portions of the side wall, said first portion is located the closest to the axis of rotation;
- the bottom wall is provided, on its face opposite to the free space, with a mounting imprint on a motor-driven base for driving the rotary means, which mounting imprint has a substantially square profile, one of the diagonals of which substantially extends in the plane of symmetry;
- the jar further comprises a handle borne by the first portion, protruding from its face turned opposite to the free space, said handle is advantageously symmetrical with respect to the plane of symmetry;
- the jar further comprises at least one baffle element which extends inside the free space, while protruding both from the side wall and from one of the five portions of the side wall outside its angular connecting areas with the other portions;
- said or each baffle element has, opposite to the bottom wall, an end which is located at a level of the side wall, between which and the free end of the side wall, the corresponding portion of the free space forms, during operation, an anti-overflow area;
- said or each baffle element has an extent protruding from the side wall, which is decreasing upon moving away from the bottom wall;
- said or each baffle element has, opposite to the bottom wall, an end which delimits an abutment surface for an additional jar when such an additional jar is stacked on the jar while being introduced into the free space.

BRIEF DESCRIPTION OF THE DRAWINGS

The invention will be better understood upon reading the description which follows, only given as an example and made with reference to the drawings wherein.

DETAILED DESCRIPTION OF THE PREFERRED EMBODIMENTS

In FIGS. 1 to 8, a blender jar 1 is illustrated, which may also be described as a mixer jar. In the exemplary embodiments considered in the figures, this jar 1 comprises two main components, i.e. a container 2 able to contain foodstuffs, not shown, intended to be processed in this jar, notably by mixing them, liquefying them and/or reducing them into puree on the one hand and a lid 3 for closing the container 2 on the other hand.

The container 2 thus defines a free space V in which the foodstuffs to be processed are contained. This free space V is delimited both by a bottom wall 10 of the container 2 and by a side wall 12 of this container, this side wall 12 extending transversely from the outer periphery of the bottom wall 10, as this is well visible in FIGS. 2 and 4. In the exemplary embodiment considered here, the side wall 12 extends from the bottom wall 10 along a direction close to the perpendicular to the geometrical plane in which the bottom wall 10 is globally included. More specifically, the aforementioned direction and geometrical plane form between them an obtuse angle, slightly greater than 90°, so that, upon moving away from the bottom wall 10, the side wall 12 slightly flares. It will be noted that the side wall 12 has a cross-section with a closed contour, such as this is well visible in FIGS. 6 and 7: thus, the container 2 may be described as globally having a tubular shape, the side wall 12 forming the corresponding tubular main body while the bottom wall 10 closes one of the axial ends of this body.

By convenience, the following of the description is oriented by considering that the geometrical plane, in which the bottom wall 10 is globally included, is horizontal, with the face of the bottom wall 10, delimiting the free space V, turned upwards. Thus, the term of "upper" and "high" designates a direction oriented upwards with respect to the aforementioned geometrical plane, which corresponds to a direction turned towards the top portion of FIGS. 1 to 4, while the terms of "lower" and "low" designate a direction in the opposite sense. In practice, it will be noted that the orientation which has just been defined, amounts to describing the jar 1 when the latter rests, directly or indirectly, on a horizontal planar surface, of the work plane type, with the free space V open upwards facing this surface of the working plane type.

In the exemplary embodiment considered here, the bottom wall 10 is not strictly planar, but is slightly bulging downwards. More specifically, as this is well visible in FIGS. 2 to 4, the bottom wall 10 has an upper face 10A, which, according to the orientation with the description specified above, is the face of this bottom wall 10 delimiting the free space V, and which is concave, with its lowest area located in the central regions of the bottom wall 10.

The central region of the bottom wall 10 has a through-hole 10.1 connecting together the upper 10A and lower 10B faces of the bottom wall 10. Inside the through-hole 10.1, a transmission mechanism 14 is laid out between the output of a driving motor integrated to a base, not shown, on which the container 2 is designed so as to be mounted thereto, by means of arrangements which will be detailed later on, and a knife 16 is laid out in the lower portion of the free space V, overhanging the bottom wall 10. The knife 16 is adapted so that, under the driving action of the transmission mechanism 14 it rotates on itself around a predetermined axis Z-Z defined by the transmission mechanism 14, this axis of rotation being fixed relatively to the bottom wall 10. Thus, in the exemplary embodiment considered here, this axis of rotation Z-Z is substantially aligned with the central axis of the through-hole 10.1 of the bottom wall 10.

In a way known per se, the rotation on itself of the knife 16 processes the foodstuffs contained in the container 2, for example under the cutting effect produced by one or several cutting blades with which the knife 16 is provided and which liquefy or reduce the foodstuffs into a puree, while mixing them. The knife 16 will not be described here in more detail, it being understood that it is not a limitation of the present invention. More generally, the knife 16 present in the embodiment shown in the figures is only an example of rotary mechanical means belonging to the jar 1 and allowing processing of the foodstuffs contained in the container 2.

As mentioned above, the side wall 12 is globally similar to a tubular body, which, as illustrated in the figures, is with an essentially pentagonal geometrical base. More specifically, the side wall 12 has, opposite to the bottom wall 10, a free upper end 12A, i.e. this upper end 12A is open, thereby allowing foodstuffs to be introduced into the inside of the free space V from the top of the side wall. Of course, it will be noted that in FIGS. 1 to 4, this free end 12A is obturated by the lid 3, while in FIG. 5, this free end 12A is shown in the absence of the lid 3.

Figure 5:
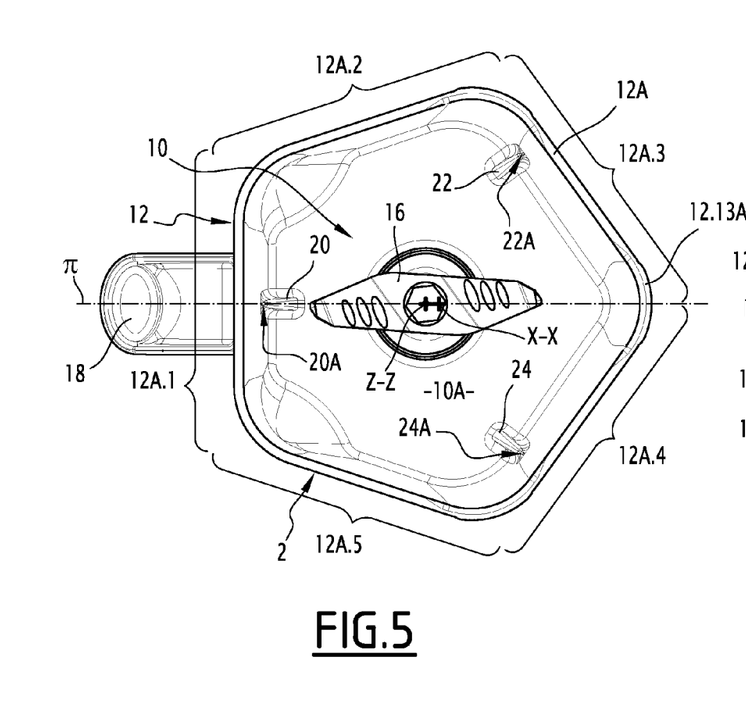
FIG. 5 is an elevational view, along the arrow V of FIG. 2, of a portion of the jar of FIG. 1.

As this is well visible in FIG. 5, the free end 12A has a peripheral contour with the shape of a regular pentagon. In other words, as observed along a direction perpendicular to the geometrical plane in which the bottom wall 10 is globally included, this free end 12A of the side wall 12 has a regular pentagonal profile. This free end 12A therefore consists of five portions 12A.1 and 12A.5 following each other in succession along the periphery of this end. Insofar that the aforementioned pentagonal profile is regular, the portions 12A.1-12A.5 of the free end 12A are identical with each other, each of these portions corresponding to a substantially rectilinear segment which, at each of its two opposite ends, connects to the segments of one of the other portions, by forming with the latter an angle of 108°. In practice, notably for safety reasons, as well as for molding reasons, each connecting area between two such segments has a curved contour so as to tangentially connect the respective segments of the portions, from among the portions 12A.1 to 12A.5, connected to each other through this connecting area.

For purposes of efficiently obturating the free end 12A with a regular pentagonal profile, the lid 3 has, on its face turned towards the side wall 12, a mounting imprint 3B on the free end 12A, which mates the latter. In other words, the mounting imprint 3B of the lid 3 also has itself, a regular pentagonal profile having the same geometrical characteristics as that of the free end 12A. Thus, it is understood that the lid 3 may be mounted on the free end 12A of the side wall 12 in five different relative positions, in each of which this lid obturates this free end, it being understood that the five positions may be indiscriminately occupied by the lid. The manipulations of the lid 3 by the user are facilitated by this, in the sense that the user does not have to mount the lid onto the free end of the container 2 in a single possible configuration, but the user has five conceivable relative configurations, all equally efficient for obturating the free end 12A of the side wall 12 by the lid. Presented otherwise, when the user positions the lid 3 vertically above the free end 12A, he/she has only to shift the relative angular positioning between this lid and this free end by at most 36° in order to reach one of the five indiscriminate positions allowing the mounting of the lid onto the free end in order to close the latter, such a maximum adjustment of 36° being easily and rapidly applied in return for an easy and natural movement of the wrist of the hand of the user, holding the lid, with respect to the container 2.

In practice, in a way known per se and therefore not detailed in the present document, the lid 3 integrates arrangements guaranteeing the seal of its closure mounting on the free end 12A of the side wall 12. More generally, outside its mounting imprint 3B as described above, the specificities of the making of the lid are not a limitation to the invention.

In the exemplary embodiment considered in the figures, upon covering the side wall 12 from its free end 12A as far as the bottom wall 10, it is noted that, as mentioned above, the geometrical base of the globally tubular body formed by this side wall 12, is pentagonal, but outside the free end 12A, for which the pentagonal profile is regular, the aforementioned pentagonal base is irregular. Moreover, as an alternative not shown, an alternative embodiment consists of providing a regular pentagonal base over the whole extent of the side wall 12, between its free end 12A, included, and its opposite end bound to the bottom wall 10, also included.

Figure 6:
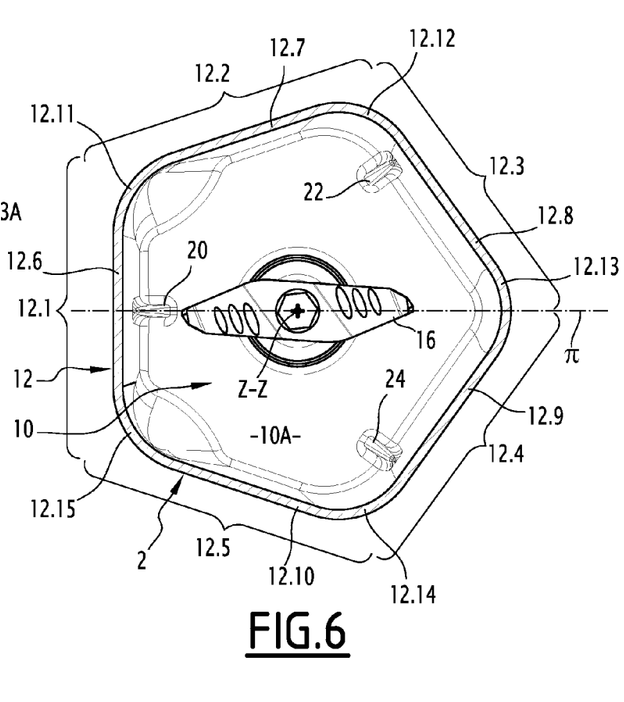
FIGS. 6 and 7 are sectional views respectively along the lines VI-VI and VII-VII of FIG. 2.
Figure 7:
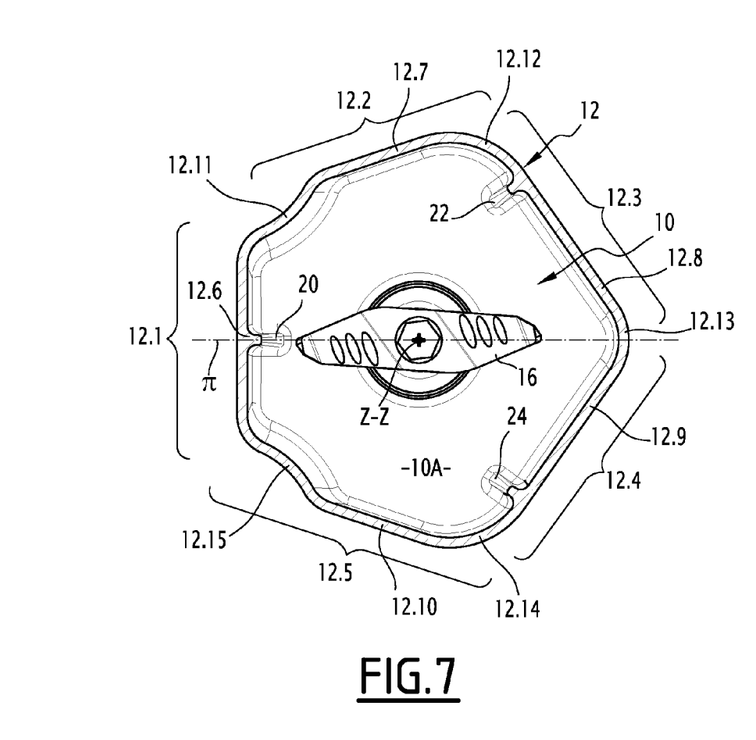

Coming back to the description of the embodiment considered in the figures, a geometrical axis X-X is defined, forming a central axis for the side wall 12. This axis X-X extends transversely to the bottom wall 10, notably in a way substantially perpendicular to the geometrical plane in which the bottom wall 10 is globally included, so that the free space V is distributed around this axis X-X. Further, at the free end 12A of the side wall 12, this axis X-X passes through the geometrical center of the regular pentagonal profile of this free end. Along a direction peripheral to this central axis X-X, the side wall 12 may be described as consisting of five portions 12.1 to 12.5 following each other in succession, as well visible in FIGS. 6 and 7. At the free end 12A, the five portions 12.1 to 12.5 of the side wall 12 respectively form the five identical portions 12A.1 to 12A.5, as defined above, of this free end 12A. Further, over the whole axial extent of the side wall 12, each portion 12.1, 12.2, 12.3, 12.4, 12.5 of the latter includes a substantially flat main portion 12.6, 12.7, 12.8, 12.9, 12.10. These main portions 12.6 to 12.10 are connected two by two through respective angular connecting areas 12.11 to 12.15, the connecting area 12.11 being formed by corresponding parts of the portions 12.1 and 12.2, the connecting area 12.12 being formed by corresponding parts of the portions 12.2 and 12.3, and so forth, as shown in FIGS. 6 and 7. Each of the connecting areas 12.11 to 12.15 has an angulation, i.e. an angle sector formed between the main flat parts belonging to the two portions associated with the connecting area, the value of which is 108° at the free end 12A, as described above, but for which the value varies at the other axial levels of the side wall 12 because of the irregular nature of the pentagonal geometrical base of this side wall 12, it being however noted that, over the whole axial extent of this side wall, the value of this angulation is advantageously strictly greater than 90°.

The shape with a pentagonal base, described above, of the side wall 12 has the advantage, i.a., of facilitating and accelerating homogenization of the processing of the foodstuffs contained in the container 2. This effect notably results from a specific interaction between the vortex of the mixed foodstuffs, generated by the rotary action of the knife 16 and the portions 12.1 to 12.5 of the side wall 12, which because of their pentagonal profile, deform this vortex.

In particular, according to an advantageous arrangement, the axis of rotation Z-Z of the knife 16, which is substantially parallel to the geometrical axis X-X of the wall 12, is not at an equal distance from the wall portions 12.1 to 12.5, at least for an axial portion of the wall 12, or even for the whole axial extent of the latter like in the embodiment considered in the figures. The application of this arrangement is based here on the fact that, at the axial level of the free end 12A, the axis Z-Z does not strictly pass through the geometrical center of the regular pentagonal profile of this free end, as this is well visible in FIG. 5, on the one hand, and, below the axial level of the free end 12A, the irregularity of the pentagonal profile of the wall 12 is provided for enhancing the differences in value between the distances separating the axis of rotation Z-Z and each of the wall portions 12.1 to 12.5 on the other hand: thus, as this is well visible in FIG. 7, the distance separating the axis Z-Z and the portion 12.1 is smaller than the one separating this axis and each of the portions 12.3 and 12.4, which is itself smaller than that separating this axis and each of the portions 12.2 and 12.5, the deviation between these three distance values being increasingly pronounced upon axially covering the wall 12 from its end 12A as far as the bottom wall 10. The result of this is that the mixing flow of the foodstuffs is unbalanced around the axis Z-Z, the foodstuffs processed by the knife 16 being forced to move more rapidly upwards along the portions 12.3 and 12.4 than along the portions 12.2 and 12.5, and even more rapidly along the portions 12.1. Such unbalancing enhances the performances of the knife 16 and reduces the time required for homogenizing the mixture.

Figure 1:
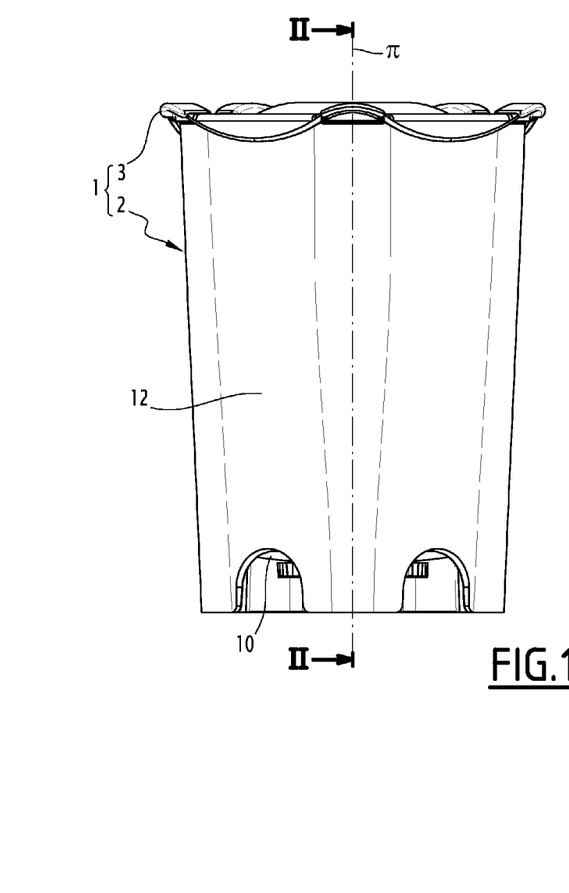
FIG. 1 is an elevational view of a jar according to the invention.
Figure 2:
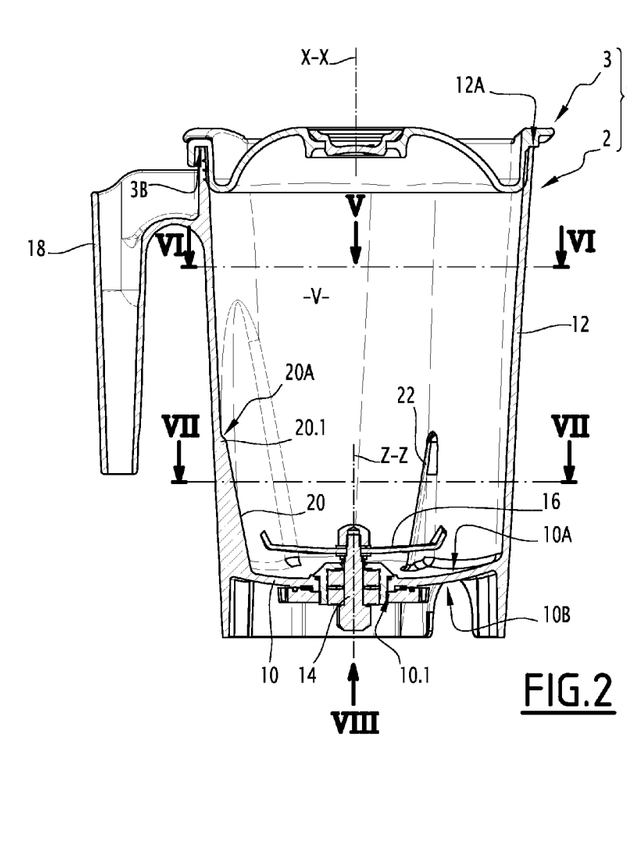
FIG. 2 is a sectional view along the line II-II of FIG. 1.

Advantageously, in the embodiment considered in the figures, the side wall 12 has a plane of symmetry $\pi$ which corresponds to the sectional plane of FIG. 2. Thus, this plane $\pi$ passes through the axis X-X and Z-Z and is substantially perpendicular to the main part 12.6 of the portion 12.1 of the side wall 12, by forming a plane of symmetry for this portion 12.1, whereas the portions 12.2 and 12.5 are symmetrical relative to each other with respect to this plane on the one hand and the portions 12.3 and 12.4 are also symmetrical to each other with respect to this plane on the other hand. By thereby being symmetrical with respect to the plane $\pi$, the side wall 12 is easier to manufacture, and this all the more so since advantageously, the bottom wall 10 also recognizes the plane $\pi$ as a plane of symmetry.

Figure 8:
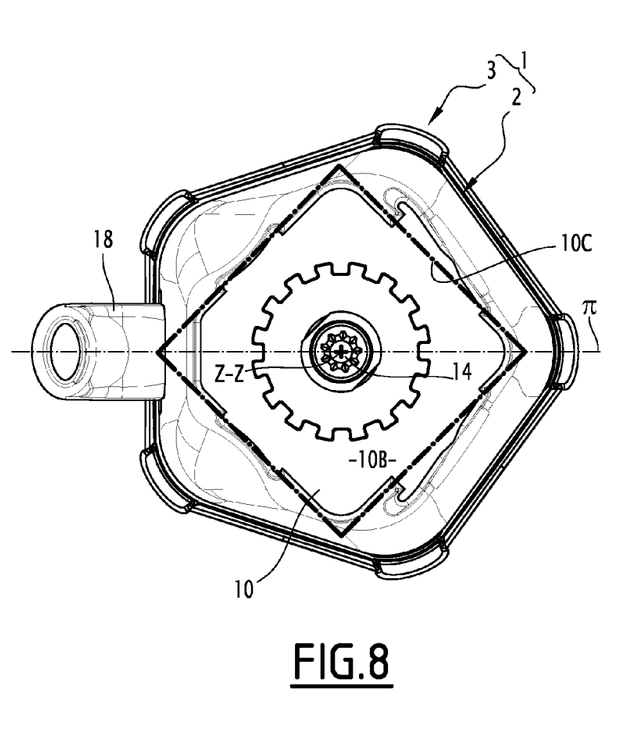
FIG. 8 is an elevational view along the arrow VIII of FIG. 2.

Further, the fact that the side wall 12 is symmetrical with respect to the plane $\pi$ may be exploited for facilitating the manipulation of the lid 2 when the latter is to be mounted on the motor-driven base, as mentioned above, allowing the knife 16 to be driven. Indeed, in the exemplary embodiment considered in the figures, the bottom wall 10 delimits, on its lower face 10B, a mounting imprint 10C on this motor-driven base, as illustrated in FIG. 8: this mounting imprint 10C, the specific embodiment structure of which is not a limitation of the invention, is provided with a square profile, one of the two diagonals of which extends in the plane of symmetry $\pi$. In this way, the relative angular positioning between the mounting imprint 10C with a square profile and the side wall 12 with a pentagonal profile is easily and naturally taken into account by the user. In other words, more practically, notably by means of a gripping handle 18 borne by the portion 12.1 of the side wall 12, protruding from its face turned opposite to the free space V, the user is able to manipulate the side wall 12 until its placement vertically above the aforementioned motor-driven base, while orienting it angularly around the axis X-X so that the mounting imprinting 10C may surely be vertically engaged with a corresponding mating portion of the motor-driven base, then ensuring mechanical connection between the transmission mechanism 14 and the output of the motor of this base. In this case, with the embodiment considered here, the user easily manipulates the container 2 so as to position the plane of symmetry π along one of the two diagonals of the square portion of the motor-driven base, intended to be vertically engaged with the mounting imprint 10C, so that the handle 18 is substantially found vertically above one of the apices of this square portion, as this is understood upon examining FIG. 8.

Advantageously, by providing that the plane π also forms a plane of symmetry for the handle 18, it is understood that the manipulation of the container 2 for the purpose of mounting it on the aforementioned motor-driven base is just as easily performed by the right hand of a right-handed user than by the left hand of a left-handed user.

An additional benefit of this plane of symmetry π is of an ergonomic nature. Indeed, in the embodiment considered in the figures, this plane π contains the axis of rotation Z-Z and is normal to the wall portion 12.1 the closest to the axis of rotation Z-Z of the knife 16, so that the handle 18 is found at a distance as small as possible from the axis Z-Z. The pentagonal shape, either regular or not, having the characteristic of having an apex opposite each side, the angular connecting area 12.13, forming the apex opposite to the wall portion 12.1 bearing the handle 18, is crossed by the plane of symmetry π, advantageously symmetrically, so that the center of gravity of the container 2, including when it contains foodstuffs, is substantially in the plane π. The result of this is perfect ergonomics during the pouring of the contents of the container 12 through the pouring spout which the free end 12.13A of the connecting area 12.13 then forms, this free end 12.13A of course forming a peripheral portion of the free end 12A of the wall 12, formed by the connection between the portions 12A.3 and 12A.4: during the whole operation for emptying the container 2, the center of gravity remains substantially located in the plane of symmetry π, which limits the transverse stresses on the wrist of the user holding the handle 18. In this context, as this is well visible in FIG. 5, the free end 12.13A of the connecting area 12.13 is advantageously conformed as a drop-breaking pouring spout. Moreover, it will be noted that, by positioning the handle 18 on the wall portion 12.1 the closest to the aforementioned center of gravity, the required force for the user for pouring the contents of the container 2 is reduced.

As a particularly advantageous optional arrangement, the container 2 comprises at least one baffle element, three of such baffle elements respectively referenced as 20, 22 and 24, being provided in the embodiment considered in the figures. Each of these baffle elements 20, 22 and 24 extend inside the free space V, as a protruding rib both from the bottom wall 10 and from the side wall 12. More specifically, as regards the layout of these baffle elements, 20, 22 and 24, with respect to the side wall 12, the baffle element 20 protrudes from the main part 12.6 of the portion 12.1 of this side wall 12, the baffle element 22 protrudes from the main part 12.8 of the portion 12.3, and the baffle element 24 protrudes from the part 12.9 of the portion 12.4. In the exemplary embodiment considered here, these baffle elements 20, 22 and 24 are individually identical with each other, it being moreover noted that, advantageously, the plane π forms a plane of symmetry for the baffle element 20 and the baffle elements 22 and 24 are the symmetrical of each other relatively to this plane π, facilitating i.a. the manufacturing of the container 2 in particular by injection of plastic material.

When operating, i.e. when the foodstuffs contained in the container 2 are mixed under the action of the rotary knife 16, the vortex formed by the thereby mixed foodstuffs is perturbed in its flow around the axis of rotation of the knife 16 by each of these baffle elements 20, 22 and 24, improving the efficiency and the rapidity of homogenization of this mixture. In this sense, the baffle elements 20, 22 and 24 are advantageously distributed in a substantially regular way around this axis of rotation, it being understood that this arrangement is not a limitation of the invention, just as moreover, more generally the number of such baffle elements. It will be noted that, by providing that these baffle elements 20, 22 and 24 extend and protrude from the side wall 12, from the respective main parts of the portions of the latter, the perturbations of the vortex induced by the baffle elements are increased tenfold, in the sense that, along the periphery of the side wall 12, the flow section of the vortex, around the axis of rotation of the knife 16, is found to be significantly reduced at the periphery of the baffle elements, as this is well visible in FIGS. 2 to 4 as regards the baffle element 20. More specifically, each baffle element 20, 22 and 24 is opposed to the flow of the outermost portion of the vortex along a peripheral direction with respect to the axis of rotation of the knife 16. The aforementioned portion of the vortex is broken and the flow of foodstuff mixture corresponding to this portion of the vortex is forced by the baffle element to flow upwards, by deviation of the flow trajectory which thus seeks to circumvent the baffle element. At the same time, on the side of the baffle element, opposite to the one breaking the aforementioned portion of the vortex, a cavitation effect is somewhat observed.

Furthermore, by taking into account the foregoing explanations, it is understood that the effect of the baffle elements 20, 22 and 24 is increased tenfold by the pentagonal profile of the wall 12, in particular by the irregular pentagonal profile of the low portion of this wall 12 where these baffle elements are laid out. Indeed, as explained above for the embodiment considered in the figures, the wall portion 12.1 is the closest of the five portions 12.1 to 12.5 to the axis of rotation Z-Z of the knife 16, so that the baffle element 20 borne by this portion 12.1 is found to be the closest to this axis Z-Z and perturbs the circulation of the foodstuffs in the container most strongly or, in any case in a different way than the baffle elements 22 and 24, further away from the axis of rotation Z-Z, while individually, the three baffle elements are identical.

An advantageous arrangement consists of providing that the axial extent of the baffle elements 20, 22 and 24, i.e. their protruding dimension from the bottom wall 10, be limited, in the sense that the respective upper ends 20.1, 22.1 and 24.1 of the baffle elements 20, 22 and 24 are not located at the level of or in immediate proximity to the upper free end 12A of the wall 12, but, on the contrary, occupy an intermediate axial level, for example substantially median, between the bottom wall 10 and this free end 12A. In this way, the portion of the free space V, located between the axial level where these upper ends 20.1, 22.1, 24.1 are located, of the baffle element 20, 22 and 24 and the upper free end 12A of the side wall 12, forms an anti-overflow area: during operation, when the amount of mixed foodstuffs is such that at least the low portion of this anti-overflow area contains a portion of the mixture of the foodstuffs, this portion of the mixture of the foodstuffs forms an obstacle, or even somewhat a liquid plug, against which the flows of the mixture of foodstuffs deviated upwards by the baffle elements 20, 22 and 24 will abut. Thus, it is understood that the aforementioned flows are considerably slowed down, or even broken, which avoids the substantial projection upwards and which especially forces the mixture of foodstuffs forming these flows to return towards the lower portion of the free space V, in particular directly towards the cavitation area at the rear of the baffle element. The processing of the foodstuff mixture is made to be particularly efficient.

Independently of the advantageous arrangement which has just been described, another advantageous arrangement consists of providing that the baffle elements 20, 22 and 24 have a protruding dimension relatively to the side wall 12 which is not constant over the whole axial extent of the baffle element, but like in the example illustrated in the figures, a protruding dimension which has a decreasing value upon moving away from the bottom wall. In this way, only the outermost portion of the flow of the mixture of foodstuffs deviated by each of the baffle elements 20, 22 and 24, i.e. the portion of this flow licking the inner periphery of the side wall 12, is forced to deviate as far as the upper end 20.1, 22.1, 24.1 of the baffle element, while the remainder of this flow is only deviated by the baffle element as far as an intermediate axial level of the baffle element so that it is more rapidly reintroduced into the vortex, while perturbing flow in the low portion of the space V.

Figure 3:
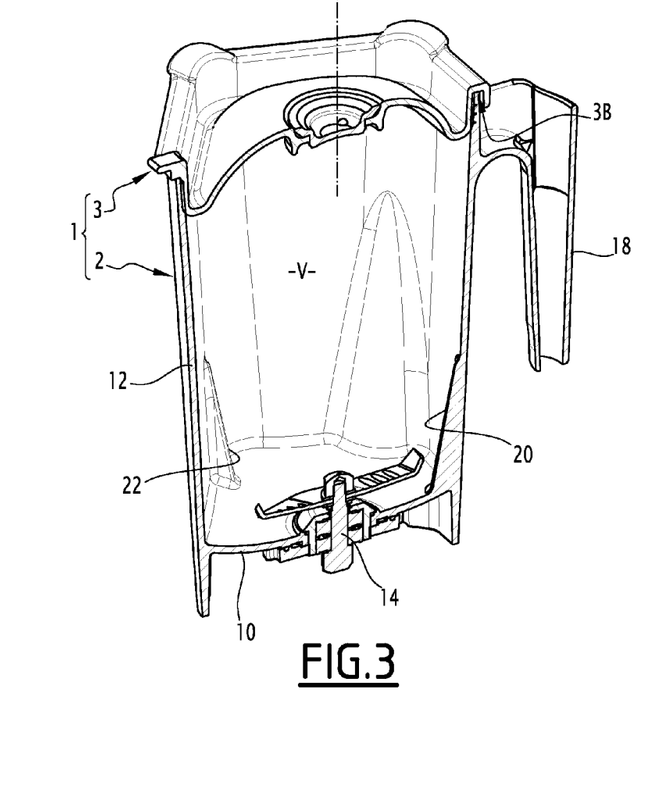
FIGS. 3 and 4 are perspective views of a half-section of the jar of FIG. 1, with a sectional plane corresponding to the plane of FIG. 2, these FIGS. 3 and 4 having respective different angles of observation.
Figure 4:
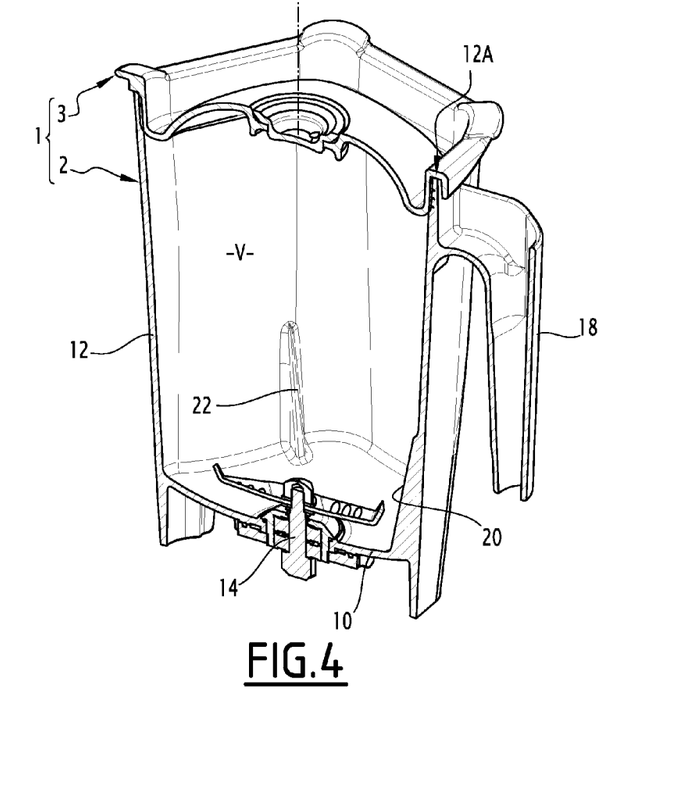

Moreover, each or the upper ends 20.1, 22.1 and 24.1 of the baffle elements 20, 22 and 24 is advantageously conformed as a shouldered surface 20A, 22A, 24A as this is well visible in FIGS. 2 to 4 for the baffle element 20. These shouldered surfaces 20A, 22A and 24A are designed so as to form abutments downwards for an additional jar when such an additional jar is stacked on the jar 1 by being introduced into the top portion of the free space V. This additional jar, thus stacked on the jar 1, does not risk being blocked against the inside of the side wall 12. Further, a stack of several jars, similar to the jar 1, may be achieved in a stable way.

Various arrangements and alternatives to the jar 1 described up to now may moreover be contemplated. As examples:
- notably for reinforcing the perturbation of the flow of the mixed foodstuffs in the container 2, one or more of the angular connecting areas 12.11 to 12.15, in particular the low portion of the latter, may have a curved transverse contour which, interiorly, is not exclusively concave, but which is partly convex; thus, in the embodiment considered in the figures, the connecting areas 12.12, 12.13 and 12.14 have, over the whole of their axial extent, a concave inner surface, while, in their low portion, the connecting areas 12.11 and 12.15 are domed towards the inside, by each forming a dent, as this is well visible in FIGS. 3 and 5 to 7; and/or
- in addition to the free end 12.13A of the connecting area 12.13, the respective free ends of the connecting areas 12.12 and 12.14 may each be conformed as a drop-breaking pouring spout.

The invention claimed is:

1. A blender jar for processing foodstuffs with a blender, the blender jar comprising:
 a container that defines a free space for containing foodstuffs to be processed, the container including
 i) a bottom wall with a through-hole connecting together upper and lower faces of the bottom wall,
 ii) a side wall with a bottom end that extends transversely from the bottom wall, the bottom wall and the side wall together delimiting the free space, and
 iii) an open free end located at a top of the side wall, the free end for introducing the foodstuffs into the free space, the free end at the top of the side wall having a regular pentagonal profile; and
 rotary mechanical means extending through the through-hole of the bottom wall, the rotary mechanical means for processing the foodstuffs contained in the free space.

2. The blender jar according to claim 1, further comprising a lid that closes the free end at the top of the side wall, the lid being able to indiscriminately occupy five positions in which the lid obturates the free end.

3. The blender jar according to claim 1, wherein,
 the side wall defines a central axis, which extends transversely to the bottom wall and which passes through a center of the regular pentagonal profile of the free end of the side wall,
 the side wall consists of five portions following each other in succession around the central axis, the five portions, at the free end at the top of of the side wall, being identical and respectively forming the regular pentagonal profile of the free end, and
 said five portions have an irregular pentagonal profile except at the free end at the top of the side wall.

4. The blender jar according to claim 3, wherein the two portions of each pair of two successive portions of the five portions connect to each other, around the central axis, through a respective angular connecting area, each angular connecting area having a respective angulation greater than 90° over a whole axial extent of the side wall between the free end and the bottom wall.

5. The blender jar according to claim 4, further comprising at least one baffle element which extends inside the free space, while protruding both from the bottom wall and from one of the five portions of the side wall outside a corresponding one of the angular connecting areas with the other portions.

6. The blender jar according to claim 5, wherein said at least one baffle element has, opposite to the bottom wall, an end which is located at a level of the side wall, between which and the free end of the side wall, the corresponding portion of the free space forms, when operating, an anti overflow area.

7. The blender jar according to claim 5, wherein said at least one baffle element has a protruding extent of the side wall, which is decreasing upon moving away from the bottom wall.

8. The blender jar according to claim 5, wherein said at least one baffle element has, opposite to the bottom wall, an end which delimits an abutment surface for an additional jar when such an additional jar is stacked on the jar while being introduced into the free space.

9. The blender jar according to claim 3, wherein the rotary means are adapted so as to rotate around an axis of rotation, which is substantially parallel to the central axis and which is not located at an equal distance from the five portions of the side wall.

10. The blender jar according to claim 3, wherein,
 a first portion of the five portions has a plane of symmetry which passes through the central axis, and
 a second portion and a third portion of the five portions are respectively the symmetrical of a fourth portion and a fifth portion of the five portions with respect to the plane of symmetry.

11. The blender jar according to claim 10, wherein the rotary means are adapted so as to rotate around an axis of rotation, which is substantially parallel to the central axis and which is not located at an equal distance from the five portions of the side wall, wherein the plane of symmetry further passes through the axis of rotation, and wherein, among the five portions of the side wall, said first portion is located the closest to the axis of rotation.

12. The blender jar according to claim 10, wherein the bottom wall is provided with a mounting imprint with a substantially square profile with one diagonal that substantially extends in the plane of symmetry, the mounting imprint being located on the lower face of the bottom wall.

13. The blender jar according to claim 10, further comprising a handle borne by the first portion.

14. The blender jar according to claim 13, wherein said handle is symmetrical with respect to the plane of symmetry.

15. The blender jar according to claim 1, wherein the rotary mechanical means comprise i) a transmission mechanism connectable to an output of a driving motor, the transmission mechanism defining a rotation axis, and ii) a knife laid out in a lower portion of the free space and overhanging the bottom wall, the knife, under driving action of the transmission mechanism rotating around the rotation axis, the rotation axis being aligned with a central axis of the through-hole of the bottom wall.

16. The blender jar according to claim 1, wherein the rotary mechanical means comprise i) a transmission mechanism, the transmission mechanism defining a rotation axis, and ii) a knife laid out in a lower portion of the free space, overhanging the bottom wall, the knife, under driving action of the transmission mechanism, rotating around the rotation axis, the rotation axis being aligned with a central axis of the through-hole of the bottom wall.

17. The blender jar according to claim 1, wherein,
the side wall defines a central axis extending transversely to the bottom wall and passing through a center of the regular pentagonal profile of the free end,
the side wall comprises five portions that follow each other in succession around the central axis, the five portions forming, at an upper part of the side wall adjacent the free end, the regular pentagonal profile of the free end, and
the five portions have an irregular pentagonal profile in lower part of the side wall below the upper part of the side wall.

18. The blender jar according to claim 17, wherein the side wall further comprises five angular connecting areas, each angular connecting area connect a respective pair of the five portions to each other around the central axis, each angular connecting area having a respective angulation greater than 90° over a whole axial extent of the side wall between the free end and the bottom wall.

* * * * *